April 12, 1949.

F. PERRUCA 2,466,964

TORQUE LOADER FOR VARIABLE
SPEED FRICTION GEARINGS
Filed May 2, 1947

INVENTOR.
Felix Perruca
BY
ATTORNEYS

UNITED STATES PATENT OFFICE 2,466,964

TORQUE LOADER FOR VARIABLE SPEED FRICTION GEARINGS

Felix Perruca, Saint-Etienne, France, assignor to Societe des Fabrications Unicum, Paris, France, a French limited liability company Application May 2, 1947, Serial No. 745,533
In France September 15, 1943

6 Claims. (Cl. 74—200)

This invention relates to variable-speed friction gearings of the kind described in United States Letters Patent No. 2,132,801 dated October 11, 1938.

These gearings comprise two rotating discs having their geometric axes in parallel but distant relation, the said discs being frictionally connected by a bi-conical roller having its axis obliquely disposed with respect to the axes of the discs in such a manner that each conical portion cooperates with a disc, the axis of the roller intersecting the plane of the disc in the vicinity of the centre of the latter.

These gearings also comprise means adapted to ensure pressure of the discs against the roller in order to avoid slip.

It is the object of the present invention to provide improved means whereby one of the discs is pressed against the friction roller substantially in proportion to the torque transmitted, and also to take up any lost motion which may result from wear or disadjustment.

According to the present invention, one of the discs is axially and angularly loose in its bearings and it is connected with the driving (or driven) shaft by means of opposed helicoidal edges in direct mutual engagement in such a manner that any relative angular displacement between the said disc and its driving (or driven) shaft will tend to cause axial displacement of the disc towards the friction roller or rollers.

According to a further feature of this invention means are provided for taking up any lost motion when no torque is transmitted. Such means preferably comprise a spring-loaded screw inserted between a part slidably keyed on the driving (or driven) shaft and carrying the helicoidal edge cooperating with the helicoidal edge carried by the disc, and spring means tending to press the said part towards the disc, whereby the lost motion is first taken up elastically by the said spring means and thereafter in an irreversible manner by the spring-loaded screw.

One embodiment of the invention is illustrated by way of example in the accompanying drawings in which.

Figure 1:
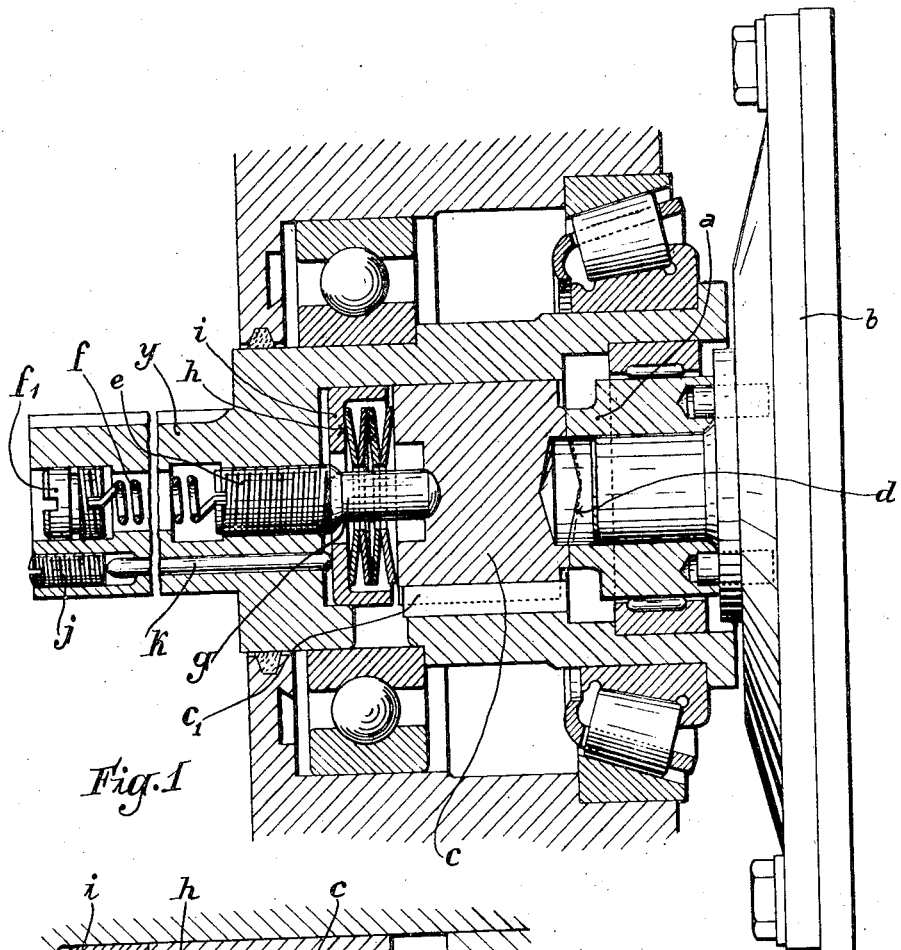
Fig. 1 is a section showing the operating member of the speed varying means (in position of normal drive).
Figure 2:
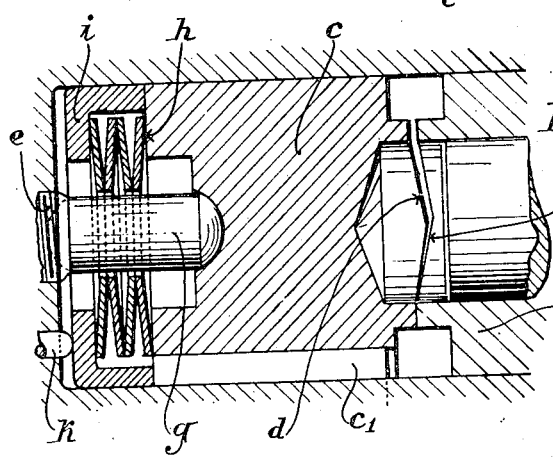
Fig. 2 is a view partly in section to an enlarged scale of the central part (in the position of maximum compression).
Figure 3:
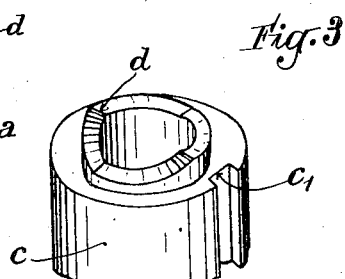
Fig. 3 is a perspective view to a reduced scale of the ramps of the rear bearing.

Referring to the drawings, the hub $a$ of the receiving or driven plate or disc $b$ and the corresponding thrust member $c$ have their contacting faces each in the form of two pairs of opposed ramps $d$ each formed over ¼ of its development in the manner of the beginning of a thread of square section, each pair being formed with two opposed ramps. The thrust member $c$ slides longitudinally on a keyway $c'$.

The opposed arrangements are identical in the two members $a$ and $c$, each of the ramps having its male or female part opposite. It should be noted that according to the direction of rotation either the ramp with the right hand pitch or the ramp with the left hand pitch is in contact with its counterpart.

With these arrangements there is a maximum bearing surface of the pair of ramps in contact because the angle or pitch of the screw of these ramps is arranged to be reversible—a condition indispensable to permit automatic disengagement as soon as the driving torque decreases.

For automatic longitudinal adjustment spring washers are employed in combination with a spring acting in torsion.

A screw $e$ operated by a torsional spring $f$ acts on an independent abutment $g$ with opposite partly spherical heads bearing one in the groove in the thrust member $c$ and the other one in the groove in the end of the screw $e$.

Spring washers $h$ of the Belleville or similar type are located in a movable casing $i$. This movable casing has a depth such that the spring washers $h$ will extend beyond it so as to allow the springs to be compressed until the thrust member $c$ abuts against the face of the movable casing $i$. This arrangement limits the force acting on washers $h$ and which would otherwise be liable to exceed the limit of elasticity of the said spring washers $h$.

With these arrangements and under the action of the spring washers $i$ there is obtained at rest a permanent pressure acting on the driven disc $b$ irrespective of any other resultant of the driving torque.

Owing to the displacement of the thrust member $c$ under the automatic action of the screw $e$ the movable casing $i$ must be displaced accordingly to follow the said thrust member. This is obtained by screwing screws $j$ and consequently by pushing rods $k$ provided behind casing $i$ in a tail portion of the hollow driven member wherein the device described is enclosed.

It will be readily understood that at rest screw $e$ will take up any lost motion between $a$ and $c$, these parts being pushed against one another by washers *h*, adjusted by screws *j*. Under load, an additional force is applied to disc *b* in proportion of the torque transmitted by the opposed ramps of members *a* and *c*.

I claim:

1. In a variable speed friction gearing of the type comprising a disc member in engagement with friction rollers, a disc formed with a hub having at its free end opposed helicoidal ramps; a rotatable disc-supporting member in which said hub is angularly and axially loose; a thrust member slidably carried within said disc-supporting member and adapted to rotate therewith, said thrust member having opposed helicoidal ramps adapted for cooperation with said first-named helicoidal ramps in such a manner that said disc is axially displaced outwardly of said disc-supporting member when it is rotated with respect therewith in either direction starting from a position of full engagement of said first and second-named helicoidal ramps; a thrust screw carried by said disc-supporting member and acting on said thrust member to adjust longitudinal position of same; torsional spring means tending to rotate said thrust screw in the direction corresponding to axial displacement of said thrust member towards said disc; and spring means resting against said disc-supporting member and said thrust member to urge the latter towards said disc.

2. In a variable speed friction gearing as claimed in claim 1, means on said disc-supporting member to adjust longitudinal position of said last-named spring means.

3. In a variable speed friction gearing as claimed in claim 1 an axially slidable member within said disc-supporting member to support axial reaction of said last-named spring means; rods slidable through said disc-supporting member in parallel relation to the axis thereof and adapted to act on said slidable member to displace same against the reaction of said second-named spring means; and screws screwed in said disc-supporting member to act on said rods.

4. In a variable speed friction gearing of the type comprising a disc member in engagement with friction rollers, a disc formed with a hub having at its free end opposed helicoidal ramps; means to rotatably support said disc while permitting limited axial displacement thereof; a disc-driving thrust member adapted to rotate in co-axial relation with said disc, said member being also formed with helicoidal ramps adapted to engage the helicoidal ramps of said disc; means to support said thrust member while permitting limited axial displacement thereof; means to shift said thrust member to take up lost motion between said first and second-named helicoidal ramps when substantially no torque is being transmitted; and irreversible means elastically urged against said thrust member to prevent backward displacement thereof under the action of said first and second-named helicoidal ramps.

5. In a variable speed friction gearing of the type comprising a disc member in engagement with friction rollers, a disc formed with a hub having at its free end opposed helicoidal ramps; means to rotatably support said disc while permitting limited axial displacement thereof; a disc-driving thrust member adapted to rotate in co-axial relation with said disc, said member being also formed with helicoidal ramps adapted to engage the helicoidal ramps of said disc; a rotatable but axially fixed supporting member for said thrust member, said supporting member being slidably connected with said thrust member; spring means interposed between said thrust member and said supporting member to take up lost motion between said first and second-named helicoidal ramps when substantially no torque is being transmitted; a thrust screw carried by said supporting member and adapted to act on said thrust member to urge the latter towards said disc; and torsional spring means acting on said screw to urge the latter against said thrust member to prevent backward displacement thereof under the action of said first and second-named ramps.

6. In a variable speed friction gearing as claimed in claim 5, means on said supporting member to adjust said first-named spring means.

FÉLIX PERRUCA.

REFERENCES CITED

The following references are of record in the file of this patent:

UNITED STATES PATENTS

| Number | Name | Date |
|---|---|---|
| Re. 20,801 | Gove et al. | July 19, 1938 |
| 2,014,920 | Almen et al. | Sept. 17, 1935 |
| 2,134,225 | Christiansen | Oct. 25, 1938 |

FOREIGN PATENTS

| Number | Country | Date |
|---|---|---|
| 53,558 | France | Nov. 5, 1945 |